United States Patent
Jouy et al.

(10) Patent No.: US 11,428,110 B2
(45) Date of Patent: Aug. 30, 2022

(54) LABYRINTH SEAL ABRADABLE STRUCTURE, NOTABLY FOR AIRCRAFT TURBINE

(71) Applicant: SAFRAN AIRCRAFT ENGINES, Paris (FR)

(72) Inventors: Baptiste Marie Aubin Pierre Jouy, Moissy-Cramayel (FR); Mathieu Charles Jean Verdiere, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 98 days.

(21) Appl. No.: 16/765,026

(22) PCT Filed: Nov. 20, 2018

(86) PCT No.: PCT/FR2018/052909
§ 371 (c)(1),
(2) Date: May 18, 2020

(87) PCT Pub. No.: WO2019/102124
PCT Pub. Date: May 31, 2019

(65) Prior Publication Data
US 2020/0400033 A1    Dec. 24, 2020

(30) Foreign Application Priority Data

Nov. 21, 2017 (FR) ...................... 1761014

(51) Int. Cl.
| | |
|---|---|
| *F01D 11/12* | (2006.01) |
| *F01D 11/02* | (2006.01) |
| *F16J 15/44* | (2006.01) |
| *F16J 15/447* | (2006.01) |

(52) U.S. Cl.
CPC ............ *F01D 11/122* (2013.01); *F01D 11/02* (2013.01); *F01D 11/127* (2013.01); *F16J 15/444* (2013.01);
(Continued)

(58) Field of Classification Search
None
See application file for complete search history.

(56) References Cited

U.S. PATENT DOCUMENTS

| | | | |
|---|---|---|---|
| 6,599,611 B1 * | 7/2003 | Hall | ................... E01C 3/006 405/43 |
| 10,337,339 B2 * | 7/2019 | Harris | .................. B22F 10/20 |

(Continued)

FOREIGN PATENT DOCUMENTS

| | | |
|---|---|---|
| DE | 10259963 A1 | 7/2004 |
| DE | 102011102598 A1 | 11/2012 |

(Continued)

OTHER PUBLICATIONS

Search Report issued in French Patent Application No. 1761014 dated Jul. 10, 2018.
(Continued)

*Primary Examiner* — Juan G Flores
(74) *Attorney, Agent, or Firm* — Pearne & Gordon LLP

(57) ABSTRACT

An abradable structure (36) is provided, with regions (44, 45, 46) with lower resistance to wearing produced by labyrinth seal lips (4, 5), at specific points in the axial direction of the turbomachine, where lip interference could cause the rotor to block up, such as after a temporary shutdown of the turbomachine. These regions may be produced by local weakening (38) or by the abradable material having a structure that is less dense. Application, for example, to turbomachine turbines.

18 Claims, 4 Drawing Sheets

(52) U.S. Cl.
CPC ........... *F16J 15/445* (2013.01); *F16J 15/447* (2013.01); *F05D 2250/283* (2013.01)

(56) References Cited

U.S. PATENT DOCUMENTS

| | | | |
|---|---|---|---|
| 10,605,106 B2* | 3/2020 | Massot | F01D 11/122 |
| 2008/0260523 A1* | 10/2008 | Alvanos | F01D 11/001 |
| | | | 415/173.4 |
| 2016/0237836 A1 | 8/2016 | Harris | |
| 2018/0066527 A1* | 3/2018 | Kadau | F01D 11/122 |

FOREIGN PATENT DOCUMENTS

| | | | | |
|---|---|---|---|---|
| DE | 102012106175 A1 | 1/2013 | | |
| EP | 2613008 A1 | 7/2013 | | |
| EP | 3081763 A2 | 10/2016 | | |
| FR | 2583493 A1 * | 12/1986 | ........... | F01D 11/127 |
| FR | 2583493 A1 | 12/1986 | | |
| FR | 3028882 A1 | 5/2016 | | |
| FR | 3040461 A1 | 3/2017 | | |
| WO | 0058607 A1 | 10/2000 | | |
| WO | 2017200656 A1 | 11/2017 | | |

OTHER PUBLICATIONS

International Search Report issued in Application No. PCT/FR2018/052909 dated Mar. 6, 2019.
Written Opinion issued in Application No. PCT/FR2018/052909 dated Mar. 6, 2019.

* cited by examiner

LABYRINTH SEAL ABRADABLE STRUCTURE, NOTABLY FOR AIRCRAFT TURBINE

This is the National Stage of PCT international application PCT/FR2018/052909, filed on Nov. 20, 2018 entitled "LABYRINTH SEAL ABRADABLE STRUCTURE, NOTABLY FOR AIRCRAFT TURBINE", which claims the priority of French Patent Application No. 1761014 filed Nov. 21, 2017, both of which are incorporated herein by reference in their entirety.

The subject of the invention is a labyrinth seal abradable structure, notably for an aircraft turbine.

Labyrinth seals are disposed between two parts in relative rotation and are characterised by facing surfaces, separated from each other by a radial clearance and which tolerate a leakage flow therebetween, while limiting it by means of a sinuous shape and therefore high pressure drops which they impose thereon. The use of labyrinth seals is frequent in the turbomachines between the rotor and the stator.

It is sought to reduce the leakage rates through such seals to improve the efficiency of the turbomachine. In aeronautics, recourse is very often made to seal constructions where one of the facing parts is provided with a structure called abradable structure, having the property of low resistance to friction and wear, and which often has a honeycomb structure. The other portion of the seal, disposed on the other part comprises wipers, that is to say circular or conical projecting ridges, the free end of which is directed towards the abradable structure. This construction allows reducing the clearances between the two portions of the labyrinth seal, since the wipers can enter the abradable structure without destroying the seal, when differential thermal or mechanical expansions (due to overheating or to centrifugal forces), and occurring in circumstances such as transitional regimes temporarily bringing the abradable structure and the ridges of the wipers into contact. An example of a labyrinth seal, mentioned here because it has superficial resemblances to the invention, is the subject of document FR-3028882-A. The abradable structure in this document is designed to have a higher resistance to impacts, by avoiding tearing off large surfaces therefrom, and the abradable structure is fixed to its substrate by a connecting structure composed of honeycombs, whose cells are occupied by a portion of the abradable structure, which is here a continuous and homogeneous layer. It is specified (page 4, lines 4 to 8) that the connection structure should not be subjected to the wear of the wipers. The connection structure has denser partitions, and smaller cells, at a region located further downstream, in order to better anchor the abradable structure to a place where it can be subjected to significant forces at certain restarts of the engine, as will be developed below; but this disposition of the connection structure is opposite to that found in some embodiments of the invention, which makes it less effective in avoiding wiper lock situations in the abradable structure during the different engine operating phases ("rotor lock" situation).

An example of a very common type of labyrinth seal is shown in FIG. 1, which illustrates a fragment of a turbomachine turbine. The rotor 1 comprises at this location a stage of movable vanes 2, joined together at their tip end, which is radially external, by a root 3 here carrying two conical wipers 4 and 5, protruding radially outwards. The turbomachine also comprises a stator 6 comprising a casing 7 provided with two circular ribs 8 and 9 protruding radially inwards and carrying ends of a sealing ring 10 (normally divided into angular sectors on the circumference) connected to the ribs 8 and 9 by well-known hook adjustments 11 and 12. The sealing ring 10 comprises a rigid substrate 13, carrying the hooks, and an abradable layer 14 soldered on the substrate 13 and directed towards the wipers 4 and 5.

The gas leakage flow around the rotor 1 has its flow rate reduced by the section restrictions imposed thereon to bypass the wipers 4 and 5, the free ends of which are in the immediate proximity of the abradable structure 14. The permeability of the labyrinth seal comprising the wipers 4 and 5 and the abradable structure 14 depends above all on the clearances 15 and 16 separating the abradable structure 14 from the tip of the wipers 4 and 5. These clearances 15 and 16 have been cold adjusted by preliminary settings, and they are adjusted during the operation of the turbomachine thanks to a refreshing of the casing 7 operated by fresh air, drawn off at the compressor portion of the turbomachine and which is blown on the external face of the casing 7 by circular ramps 17 and 18 provided with orifices 19 and 20.

The disposition of the labyrinth seal in cruising speed of the turbomachine is typically that shown in FIG. 2, wherein the free ends of the wipers 4 and 5 penetrate slightly inside the original surface 21 of the abradable structure 14, after having dug notches 22 and 23 by local wear of the abradable structure 14 during transient states of the turbomachine. The clearances 15 and 16 in the seal are then much reduced, and the path of the leakage flow is sinuous and irregular, which ensures a significant pressure drop of the leakage flow, and a bearable loss of efficiency of the turbomachine.

A delicate situation nevertheless arises when the engine was turned off in flight and then re-ignited. The differential thermal expansions are modified, the stator 6 then cooling more than the rotor 1. This results in both a greater contraction of the stator 6 and an axial displacement of the rotor 1 (displacement downstream thereof, in the case of a turbine), which leads the wipers 4 and 5 to penetrate deeper into the abradable layer 14 to form new notches 24 and 25 located next to the previous ones and which are deeper, thanks to the rotation of the windmilling rotor 1 that remains. But when the engine is re-ignited, the heating first benefits the rotor 1, which expands the wipers 4 and 5, pushes them even more significantly into the new notches 24 and 25 and risks leading to a locking of the rotor 1, proscribed as very dangerous for the safety of the aircraft.

Reference is made to FIG. 3 to develop this problem of possible locking of the rotor 1 by an abradable structure 14 that is too hard. A conventional structure of the abradable 14 is composed of metal strips folded by a passage in a matrix, and several strips of this species are then assembled and welded by welding points 27 to form the conventional hexagonal structure of honeycombs. However, when the strips 26 are soldered on the substrate 13, it has been observed that the soldering material rises by capillary action between the contiguous faces of the strips 26, possibly as far as the free end of the outer layer of the abradable structure 14 intended for be disposed facing the wipers, which gives hard sections 28 between the faces in contact with the strips 26, which increase the resistance of the abradable structure 14 to wear, and all the more when they are oriented in the direction of the movement of penetration of the wipers 4 and 5 into the abradable structure 14. These portions constitute the portions of the abradable structure 14 which are the most resistant to wear and the most likely to be responsible for locking the rotor 1.

Efforts have therefore been made to reduce this risk of damage, and a new and improved design of the abradable structure has been proposed.

According to the invention, the recommended abradable structure comprises, in an outer layer provided with partitions delimiting cells, at least three regions juxtaposed to succeed one another in a direction of the axis and having wear resistances of progressive values in the direction of the axis.

The regions (which generally correspond to annular bands surrounding the axis) which are the most resistant to wear will be disposed in front of the wipers of the other portion of the seal under the conditions of cruising speed, and the regions which are the less resistant will be placed at the places where the wipers will be likely to come during events which could predict a locking of the rotor, that is to say, in the example represented above, at the location of the new notches 24 and 25.

This structure of the invention is at least on the outer layer of the abradable structure, that is to say which comprises the free surface directed towards the wipers or more generally the structures capable of wearing it, unlike FR-3028882-A; the free surface may, as the case may be, be at an internal radial or external radial position of the abradable structure.

And since there are three or more regions, with progressive wear resistances along the axis, that is to say with intermediate values for the intermediate regions along the axis, an abradability adapted to different engine operating phases is provided, depending on more or less large axial and radial expansion, in more or less marked transient states.

The preceding explanation can indeed be generalised to different durations of shutdown of the engine in flight, which then produce different differential expansions from one situation to another, the values of the expansions in the axial direction being however correlated with the values in radial direction. Then, the resistance of the abradable structure, and the permeability of the seal to leakage rates can be reduced, only to the necessary degree, therefore losing little permeability compared to a homogeneous abradable structure but subjected to the risk of rotor locking.

Now here are some features of preferred embodiments of the invention, and an explanation of their corresponding advantages. The partitions of each region can first of all advantageously join junctions which connect only three of the cells to each other and are therefore points of intersection for three of the partitions, or for three portions, which may be in extension, of the partitions. Thus, this avoids, with the junctions of a larger number of partitions to each other, the formation of hard points corresponding to a greater local rigidity of the abradable structure, with an increased risk of rotor locking.

It is recommended, to simplify the design and manufacture of the device, that the cells be in section of polygons which have the same area, which contributes notably in the homogeneity of the rigidity of the abradable structure.

The polygons or more generally the cells of the different regions can then be of identical shape, but with either different resistances, or different dimensions, and with sections of different areas. Here again, the design and manufacture of the abradable structure is facilitated. Besides hexagonal honeycomb cells conventional in the art, it will be appreciated according to the invention to also be able to select rectangular cells, square or not, which also simplify the manufacture, while allowing easy junctions between the different regions of the abradable structure.

The rectangular cells are particularly suitable for a preferred embodiment of the invention, according to which the partitions are all oriented at a non-zero angle with an angular direction perpendicular to the axis, so as to guarantee the absence of displacement of a wiper along the entire length of a partition and thus reducing the corresponding risks of rotor locking. The partitions of the cells can then be oriented at an angle comprised between 30 and 60° relative to the direction of the axis.

However, this disposition is not essential, and the rectangular cells can be composed of partitions oriented in the direction of the axis and partitions oriented in an angular direction perpendicular to the axis.

Some other dispositions allow improving the cohesion of the abradable structure. Some of the partitions may thus be main rectilinear partitions which extend through several of the cells, and others of the partitions are subdivision partitions which extend only between two consecutive main partitions. This particular disposition is particularly adapted for an embodiment described below, by allowing a staggered disposition of the cells between successive bands, which meets the criterion stated above, that the junctions between partitions are all advantageously surrounded by only three of the cells.

Some of the partitions can also be main rectilinear partitions, which extend through several of the regions, thus improving the cohesion of the assembly.

The partitions can generally have a thickness comprised between 0.1 mm and 0.3 mm.

An advantageous manufacturing method is an additive manufacturing technique, therefore without welding or similar reinforcement between portions of the abradable structure which would be manufactured separately and which would then have to be assembled, since additive manufacturing can on the contrary give a single-piece abradable structure. Thus, this also avoids any local hard point of the abradable structure and the corresponding increase in the locking risk.

Another aspect of the invention is a turbomachine turbine comprising a labyrinth seal, this seal comprising an abradable structure in accordance with the above, which is annular and preferably sectored, the regions being formed by annular bands of the abradable structure.

The labyrinth seal may then comprise wipers facing exclusively some of said annular bands of the labyrinth seal abradable structure, which are more resistant to wear, in cruising speed, others of said annular bands, but less resistant to wear, being located downstream of the previous ones.

The invention will now be described in more detail by means of the following figures, appended in an illustrative and non-limiting manner:

FIG. 1, already described, shows in cross-section a known labyrinth seal;

FIG. 2, also described, a usual pattern of wear of the abradable structure;

FIG. 3, also described, shows the structure of a conventional abradable;

Figure 7:
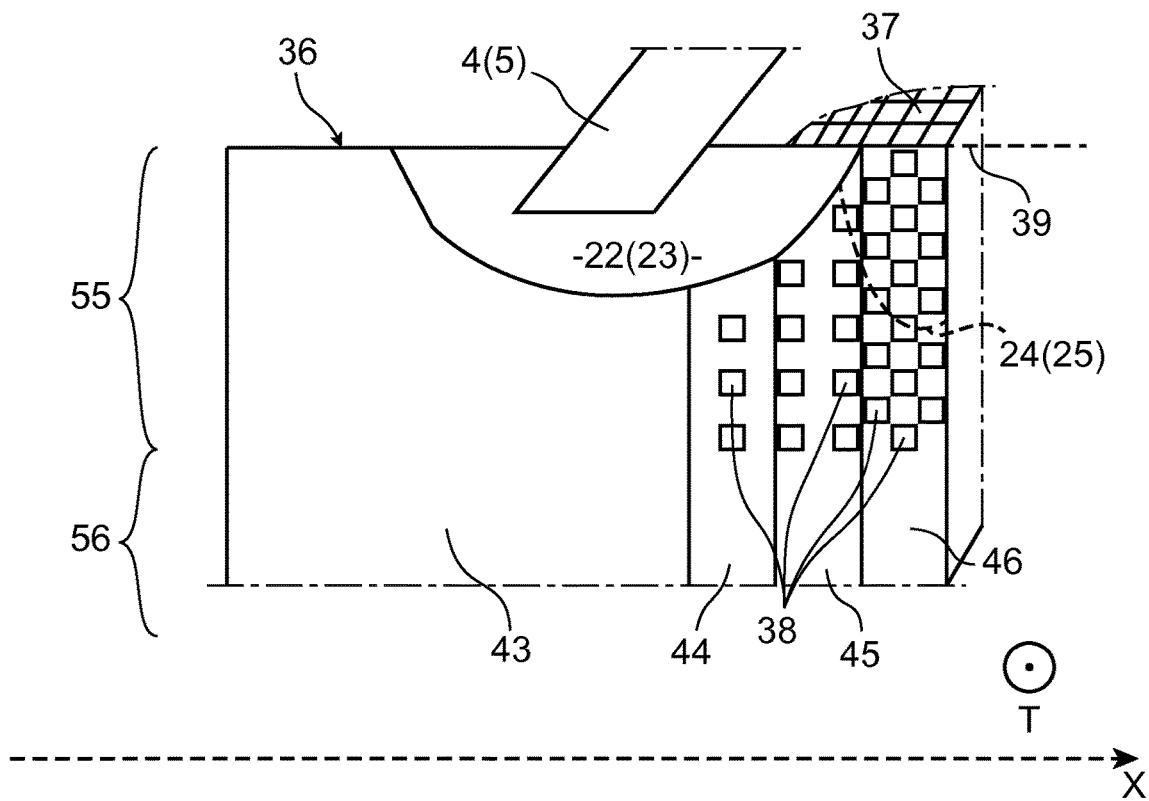
Figure 8:
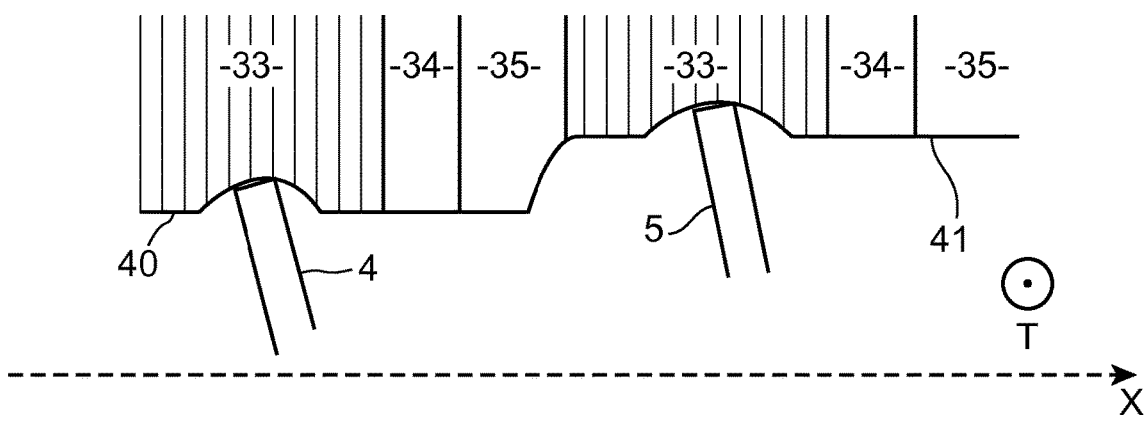

FIG. 7, a third embodiment of the invention;

FIG. 8, the implementation of an embodiment of the invention in a labyrinth seal.

Figure 1:
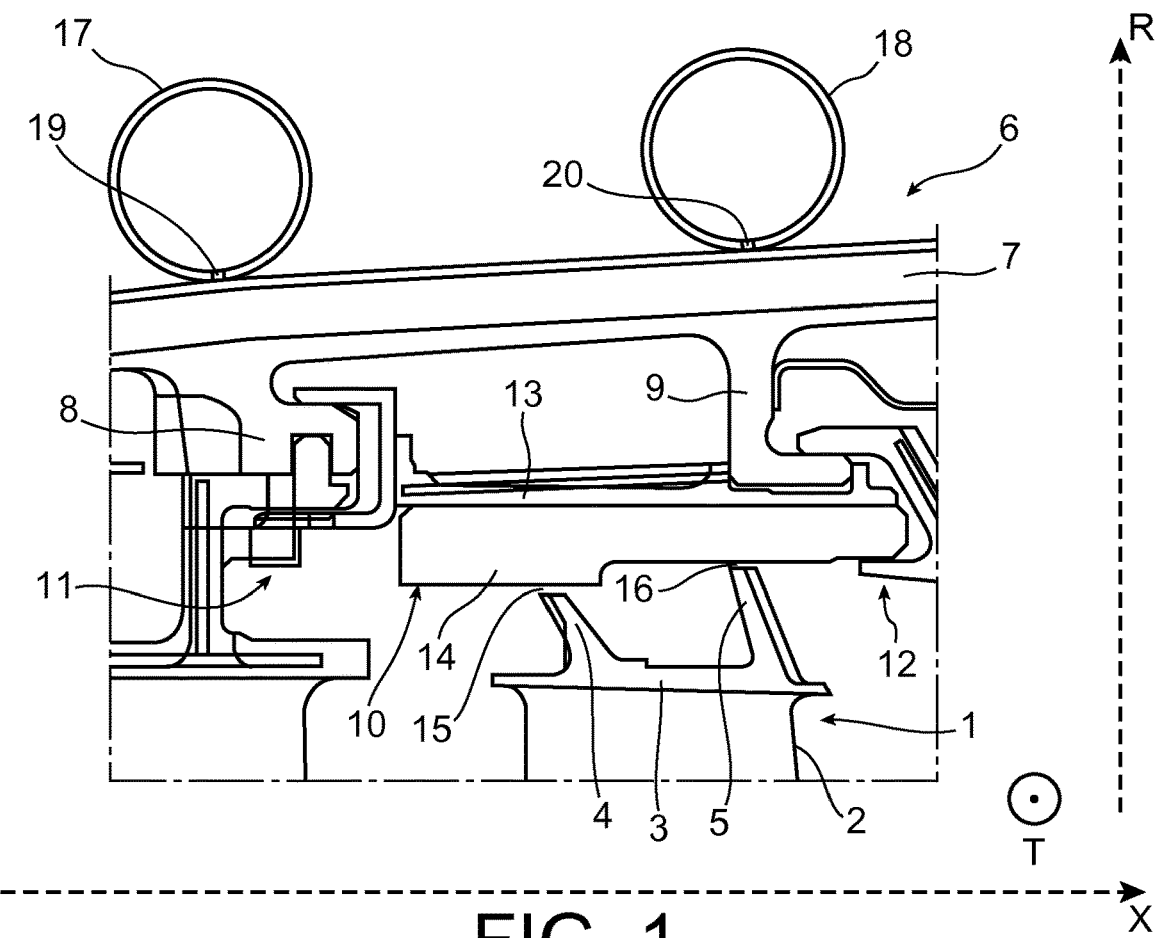
Figure 2:
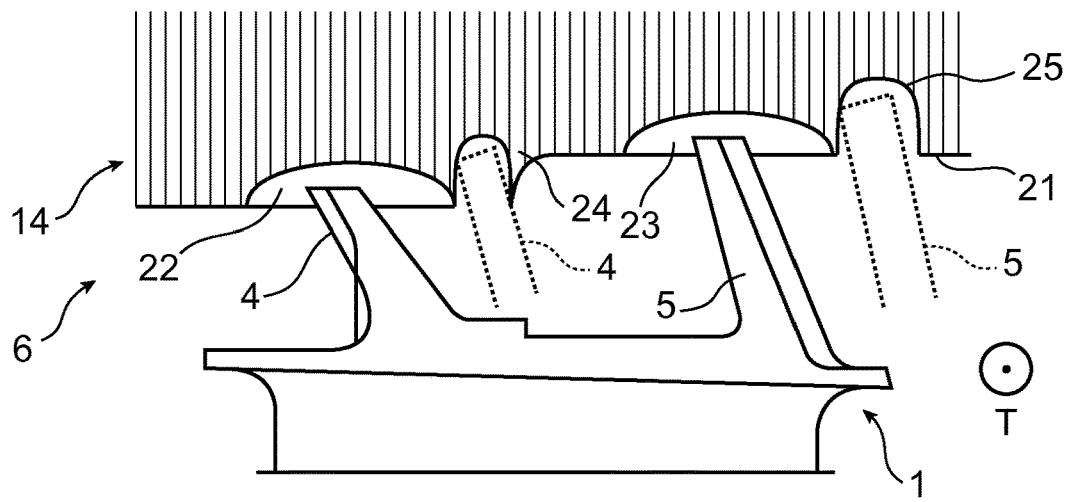
Figure 3:
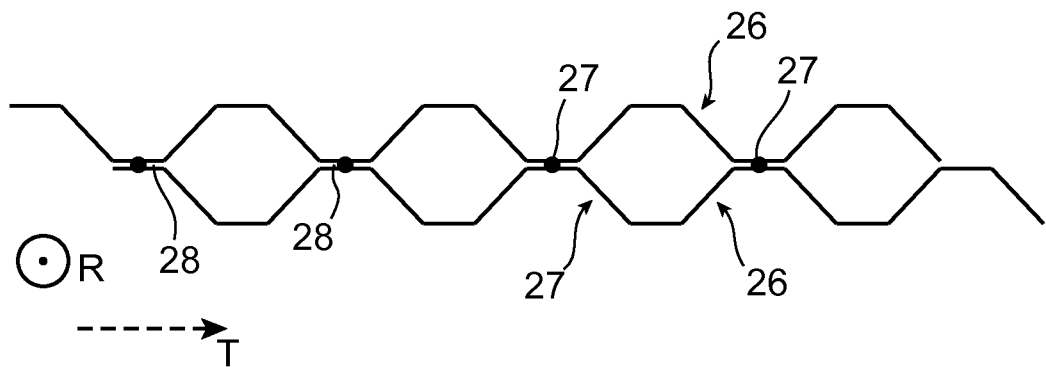
Figure 4:
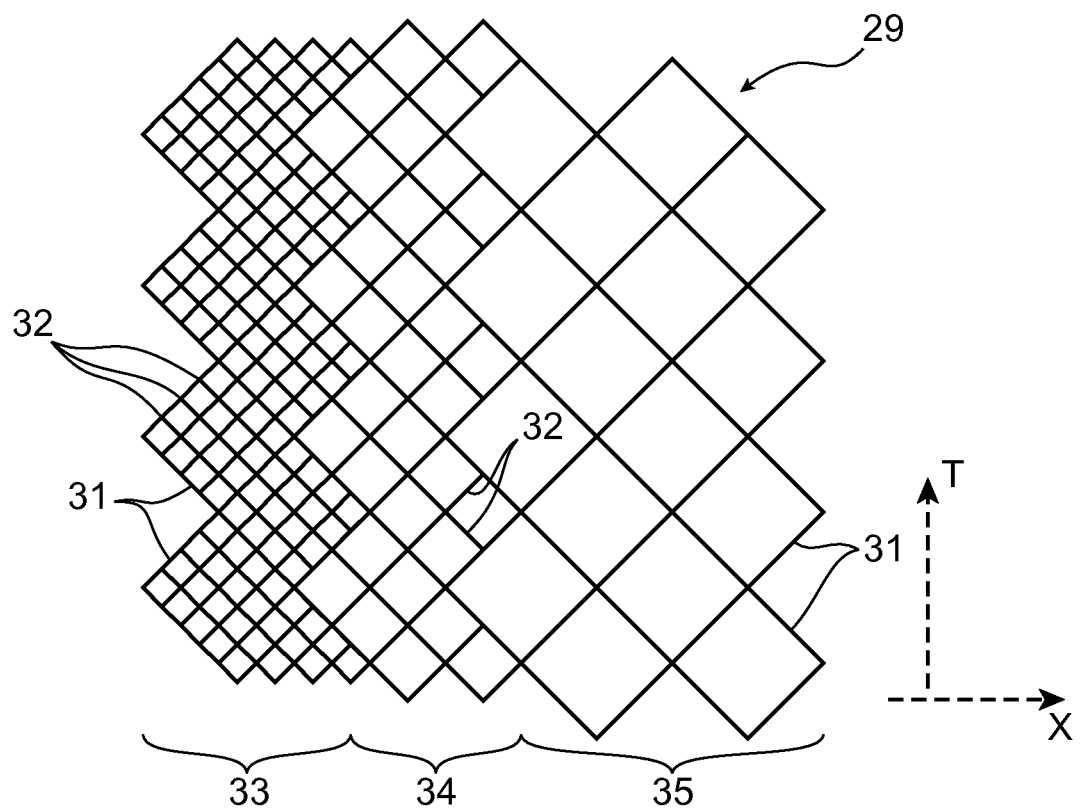
FIG. 4 illustrates a first embodiment of the invention.

A first embodiment of the invention appears in FIG. 4. The abradable structure, henceforth 29, is composed as above of a cellular structure, but which here is formed of rectilinear partitions 30, which are intersecting and delimiting rectangular cells, here square cells. The partitions 30 are advantageously all oriented obliquely to the axis X of the turbomachine, and more favourably between 30 and 60°, notably at 45° to this axis. In other words, none of the partitions 30 is directed in the angular direction T of the turbomachine perpendicular to the axis X and which is the direction of penetration of the wipers 4 and 5 into the abradable structure 29. Main partitions 31 of great length, and subdivision partitions 32 parallel to the preceding ones and extending therebetween, but only over reduced lengths and therefore along only a portion of these main partitions 31, can be distinguished among the partitions 30. As a result, the cells have variable areas: one can recognise, a band of small cells 33, a band of medium cells 34, four times larger than the previous ones, and a band of large cells 35, sixteen times larger than the first ones, succeeding each other along the axis X. The abradable structure 29 has a single-piece structure, produced by an additive technique, and the thicknesses of the partitions 30 are here uniform, of the order of 0.1 mm to 0.3 mm (thin thicknesses being preferred) for typical abradable building materials.

The band of small cells 33 will be placed in front of the wipers 4 and 5 according to their axial location at cruising speed of the engine, which is shown in FIG. 8; while the band of large cells 35 will be placed in front of the positions presumed to have been reached by the wipers 4 and 5 during the engine re-ignition speeds. The band of medium cells 34 will be intermediate.

The wear resistance of the abradable structure 29 will therefore generally be determined by the band of small cells 33, while the band of large cells 35 will give a much lower wear resistance and will be reached by wipers 4 and 5 during the situations likely to induce locking of the rotor, that is to say at the location of the new notches 24 and 25. As a result, the rotor 1 locking risks during restart will be reduced thanks to the locally lower resistance of the abradable structure 29. The use of an additive technique to manufacture a single-piece structure and form a network of partitions 30, here of uniform thickness, allows to better control the wear resistance and avoid hard sections due to the rise of solder joints between the partitions of the abradable structure, the absence of partitions oriented in the angular direction of the turbomachine 2 (which is perpendicular to the axis of the turbomachine) having the same effect.

And the medium cell band 34 will give an intermediate, medium wear resistance and will be reached by the wipers 4 and 5 during situations of stopping the engine for a shorter duration, at the end of which the thermal expansions will be less significant, as well as the risks of rotor locking at restart. It will therefore be perfectly relevant that the abradable structure has a local resistance lower than in the band of small cells 33, but stronger than in the band of large cells 35, so that its overall permeability is not too reduced.

Figure 5:
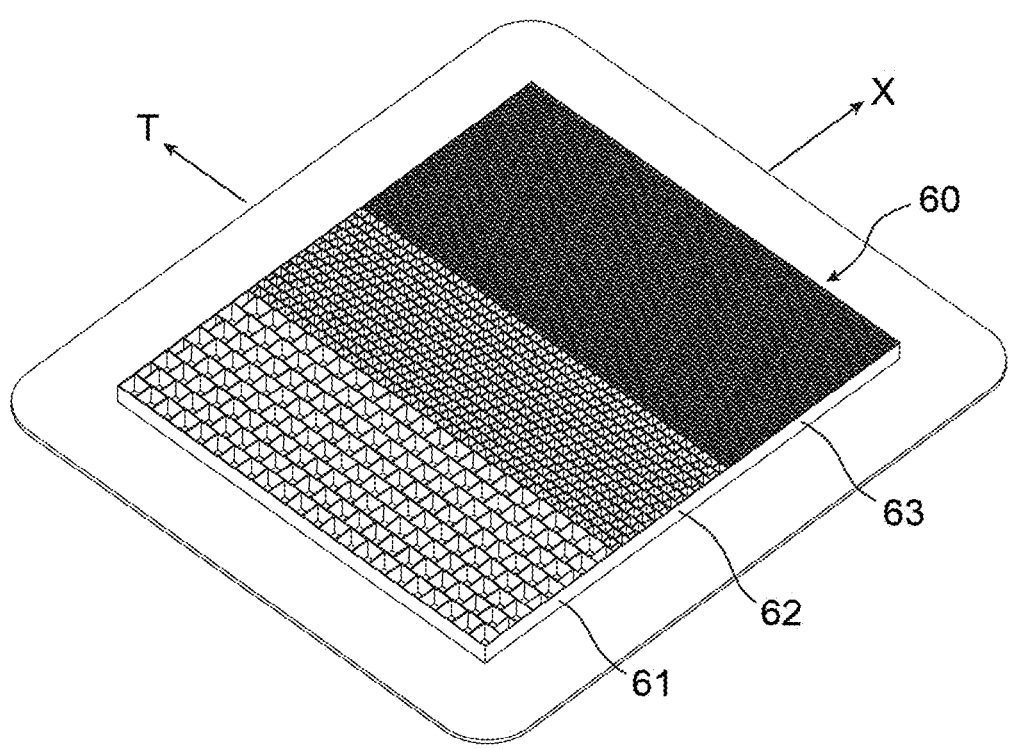
FIGS. 5 and 6 illustrate a second embodiment of the invention.
Figure 6:
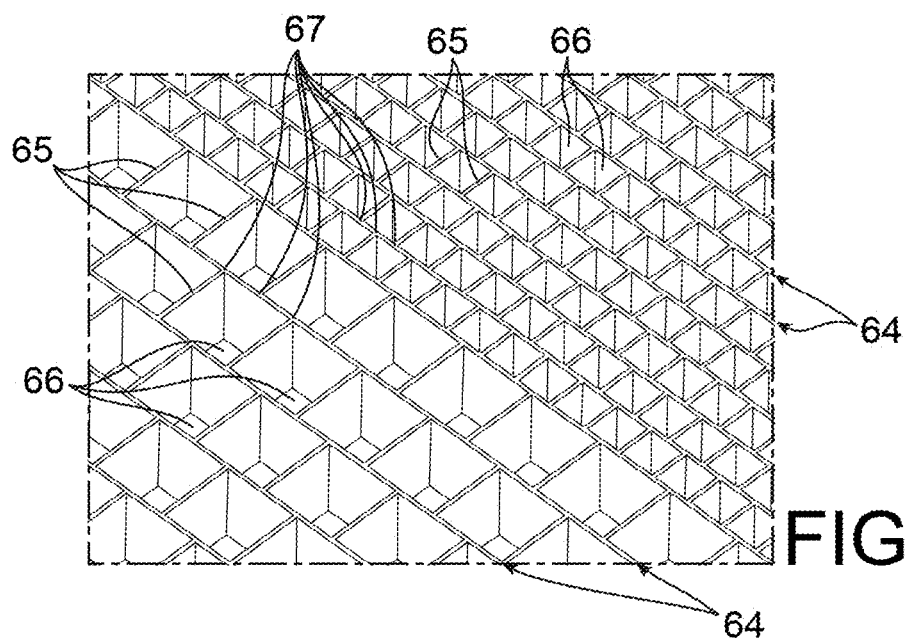

A second embodiment of the invention is described by means of FIGS. 5 and 6. The abradable structure has the general reference 60 and comprises three successive bands 61, 62 and 63, which are respectively composed of small cells, medium cells and large cells, like before. The cells (all referenced by 66) are also rectangular, in accordance with embodiments considered interesting for the invention. There are two significant differences compared to the previous design. The first is the orientation of the partitions delimiting the cells 66, which are here all disposed either in the direction of the axis X of the machine, or in its angular direction T. An orientation of the partitions which contributes in avoiding possible excessive friction of the wipers on the abradable structure 60, and the corresponding locking risks is gave up, as in the previous embodiment.

This risk is here reduced by an original disposition: the partitions of each of the bands 61, 62 and 63 are composed of main partitions 64, parallel to each other and here all oriented in the angular direction T, which extend along several of the cells and optionally over the entire width of the abradable structure 60, that is to say over its circumference, or a portion of its circumference, depending on whether it is manufactured in a ring or several annular segments then each extending over a sector of a circle; it is also composed of subdivision partitions 65, which extend between the main partitions 64, and more specifically only between two neighbouring main partitions 64; and the subdivision partitions 65 on either side of each main partition 64 do not match with each other, which gives cells 66 disposed with an angular offset, or in a staggered manner, with the cells 66 on the other side of the main partitions 64; and the network of partitions 64 and 65 composing the abradable structure 60 comprises, for each of the bands 61, 62 and 63, junction points 67 between the partitions 64 and 65 which are all surrounded by only three cells 66, and are located at the intersection of only three portions of the partitions 64 and 65, two belonging to one of the main partitions 64 and the last one to a subdivision partition 65. The junctions 67 thus have a moderate rigidity which reduces the rotor locking risk if the wipers 4 and 5 rub thereon. The main partitions 64 also contribute to the cohesion of the abradable structure 60, thanks to their large extension. A reverse disposition of the main partitions 64 and the partitions 65, in the axial X and angular T direction respectively, would also be possible.

Another embodiment of the invention is illustrated in FIG. 7. The abradable structure, then referenced by 36, is also composed of partitions 47, here also intersecting to form cells 37. It is further composed of bands 43, 44, 45, 46, here four in number, juxtaposed in the direction of the axis X. Here, however, the spacings between the partitions 39 are identical from one band to another, so that the cells 37 all have the same dimensions and the same area. The variation in resistance of the abradable structure between the bands 43, 44, 45 and 46 is obtained by embrittlement zones 38, which may consist, for example, in decreases in thickness of the partitions 47, less resistant materials or the like. Such embrittlement 38 can be easily obtained in additive manufacturing by three-dimensional printing, where the process is entirely piloted by a program. The embrittlement zones 38 are absent from the main band 43, and more and more numerous or dense in the bands 44, 45 and 46. The effect is the same as before: the resistance of the abradable structure 36 is increasingly lower from the band 43 to the opposite band 46.

Other means of creating the embrittlement zones 38 would consist of creating notches or perforations through the partitions 47.

The different features of these embodiments can generally be combined with one another.

An important aspect of the invention is that the different bands of the abradable structure 29 or 36 have originally the same height in front of a respective wiper, which is indicated by the level lines 39, 40 and 41 in FIGS. 7 and 8. In other words, the zones of the abradable structure 29 or 36 capable of locking the rotor are not originally cut off, which would have had the effect of reducing this risk of interference with the wipers 4 and 5, but at the cost of reduced performance during normal service of the turbomachine.

In a general manner, it is sufficient for the structure that has been described to extend in an outer layer of the abradable structure, limited by a free surface facing the wipers: such an outer layer is shown in FIG. 7, where it bears the reference 55, and where the structural heterogeneities are concentrated; the abradable structure could also comprise other layers 56, underlying the outer layer 55, constructed with another structure and optionally homogeneous, without departing from the scope of the invention.

The invention claimed is:

1. A labyrinth seal abradable structure disposed in a turbomachine around an axis of the turbomachine, the labyrinth seal abradable structure comprising in an outer layer provided with partitions delimiting cells, at least three regions formed by annular bands of the labyrinth seal abradable structure which are juxtaposed to succeed one another in a direction of the axis and have wear resistances of progressive values in the direction of the axis, wherein the cells are rectangular, the partitions in each of the regions are joined at junctions which connect only three cells together, and said partitions are oriented at an angle comprised between 30 and 60° relative to the direction of the axis.

2. The labyrinth seal abradable structure according to claim 1, wherein, for each of the regions, the cells have, in cross-section, the same area.

3. The labyrinth seal abradable structure according to claim 2, wherein the cells have, in cross-section, a different area for each region.

4. The labyrinth seal abradable structure according to claim 3, wherein at least one cell of a region has a local weakened zone so as to have a lower wear resistance than the other cells of the region.

5. The labyrinth seal abradable structure according to claim 1, wherein some of the partitions are main rectilinear partitions which extend through several of the cells, and others of the partitions are subdivision partitions which extend only between two consecutive main partitions.

6. The labyrinth seal abradable structure according to claim 1, wherein some of the partitions are main rectilinear partitions which extend through a plurality of the regions.

7. The labyrinth seal abradable structure according to claim 1, wherein the partitions have a thickness comprised between 0.1 mm and 0.3 mm.

8. The labyrinth seal abradable structure according to claim 1, wherein the labyrinth seal abradable structure is manufactured by an additive manufacturing technique and is formed in a single-piece.

9. A turbomachine turbine, comprising a labyrinth seal abradable structure disposed around an axis of the turbomachine, said labyrinth seal abradable structure comprising, in an outer layer provided with partitions delimiting cells, at least three regions formed by annular bands of the labyrinth seal abradable structure which are juxtaposed to succeed one another in a direction of the axis and have wear resistances of progressive values in the direction of the axis, wherein the cells are rectangular, the partitions in each of the regions are joined at junctions which connect only three cells together, and said partitions are oriented at an angle comprised between 30 and 60° relative to the direction of the axis.

10. The turbomachine turbine according to claim 9, wherein the labyrinth seal abradable structure comprises wipers facing exclusively some of said annular bands of the labyrinth seal abradable structure, which are more resistant to wear, in a cruising condition of the turbomachine, others of said annular bands, but less resistant to wear, being located downstream of the previous ones.

11. A labyrinth seal to be disposed in a turbomachine around an axis of the turbomachine, the labyrinth seal comprising:
wipers connected to a first part of the turbomachine; and
an abradable structure connected to a second part of the turbomachine, the wipers being mobile in front of the abradable structure, the abradable structure comprising, in an outer layer, at least three regions formed by annular bands of the abradable structure which are juxtaposed to succeed one another in a direction of the axis and have wear resistances of progressive values in the direction of the axis, the outer layer being defined by a free surface facing the wipers of the labyrinth seal,
wherein each of the regions is made up by partitions defining rectangular cells,
wherein all said partitions are oriented at an angle comprised between 30° and 60° relative to the direction of the axis.

12. The labyrinth seal according to claim 11, wherein, in each of the regions, the cells have cross-sections which have the same area.

13. The labyrinth seal according to claim 12, wherein the cells have, in cross-section, a different area for each region.

14. The labyrinth seal according to claim 12, wherein at least one cell of a region has a local weakened zone so as to have a lower wear resistance than the other cells of the region.

15. The labyrinth seal according to claim 11, wherein some of the partitions are main rectilinear partitions which extend through several of the cells, and others of the partitions are subdivision partitions which extend only between two consecutive main partitions.

16. The labyrinth seal according to claim 11, wherein the partitions in each of the regions are joined at junctions which connect only three cells together.

17. The labyrinth seal according to claim 11, wherein the partitions have a thickness comprised between 0.1 mm and 0.3 mm.

18. The labyrinth seal according to claim 11, manufactured by an additive manufacturing technique and has a structure formed in a single-piece.

* * * * *